United States Patent [19]
Ernst et al.

[11] Patent Number: 5,653,563
[45] Date of Patent: Aug. 5, 1997

[54] ANCHOR

[75] Inventors: Richard J. Ernst, Palatine; Mark S. Timmerman, Elgin, both of Ill.

[73] Assignee: Illinois Tool Works Inc., Glenview, Ill.

[21] Appl. No.: 548,411

[22] Filed: Oct. 26, 1995

[51] Int. Cl.$^6$ ............................ F16B 39/00; F16B 39/02
[52] U.S. Cl. ............................ 411/82; 411/258; 411/930; 405/259.5
[58] Field of Search ............................ 411/81, 180, 258, 411/930; 405/259.5, 259.6

[56] References Cited

U.S. PATENT DOCUMENTS

| | | | |
|---|---|---|---|
| 3,204,284 | 9/1965 | Merriman | 411/82 |
| 3,682,508 | 8/1972 | Brilles | 411/82 |
| 4,618,291 | 10/1986 | Wright | 411/82 |
| 4,655,644 | 4/1987 | Lane et al. | 405/259.5 |
| 4,836,729 | 6/1989 | Bisping et al. | 411/82 |
| 4,840,524 | 6/1989 | Bisping et al. | 411/180 |
| 4,941,785 | 7/1990 | Witter | 411/82 |
| 4,976,571 | 12/1990 | Mraz et al. | 411/82 |
| 5,263,804 | 11/1993 | Ernst et al. | 411/82 |

*Primary Examiner*—Steven N. Meyers
*Assistant Examiner*—Tuyet-Phuong Pham
*Attorney, Agent, or Firm*—Kane, Dalsimer, Sullivan, Kurucz, Levy, Eisele and Richard, LLP

[57] ABSTRACT

A construction anchor for mounting an object on a structure of masonry, concrete, wood, metal or the like includes an anchoring portion and a cap. The anchor is adapted to be inserted, anchoring portion first into a pre-drilled adhesive-filled hole. The anchoring portion has a threaded bore, which includes an unthreaded close-fit-counterbore portion outward of a threaded portion. The cap prevents dust, dirt and adhesive from entering the threaded bore, and has an upper surface with a removable central area. When the adhesive has set, holding the construction anchor within the hole, the central area is removed, and a screw or bolt is inserted through the hole left by the removal and engaged with the threaded portion of the threaded bore. The unthreaded close-fit-counterbore portion of the threaded bore provides a stretch zone for the screw or bolt.

18 Claims, 8 Drawing Sheets

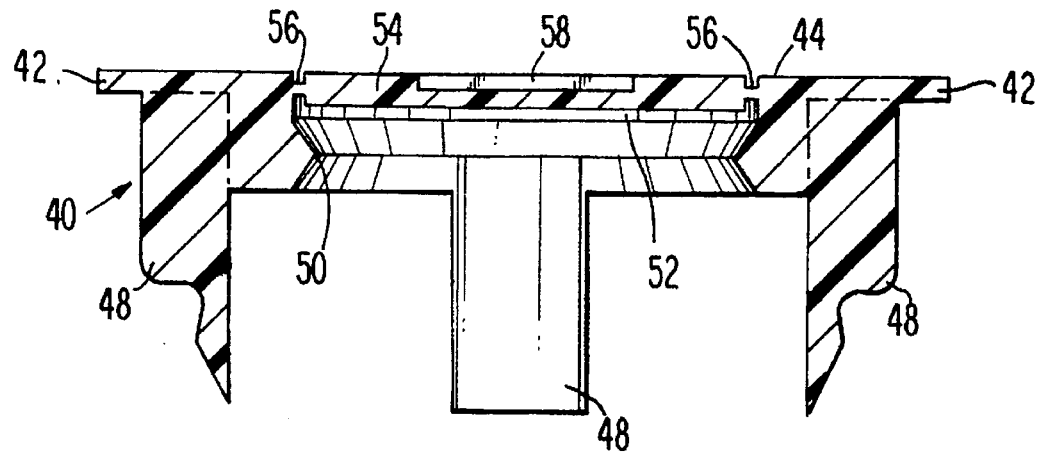
FIG.6
FIG.7
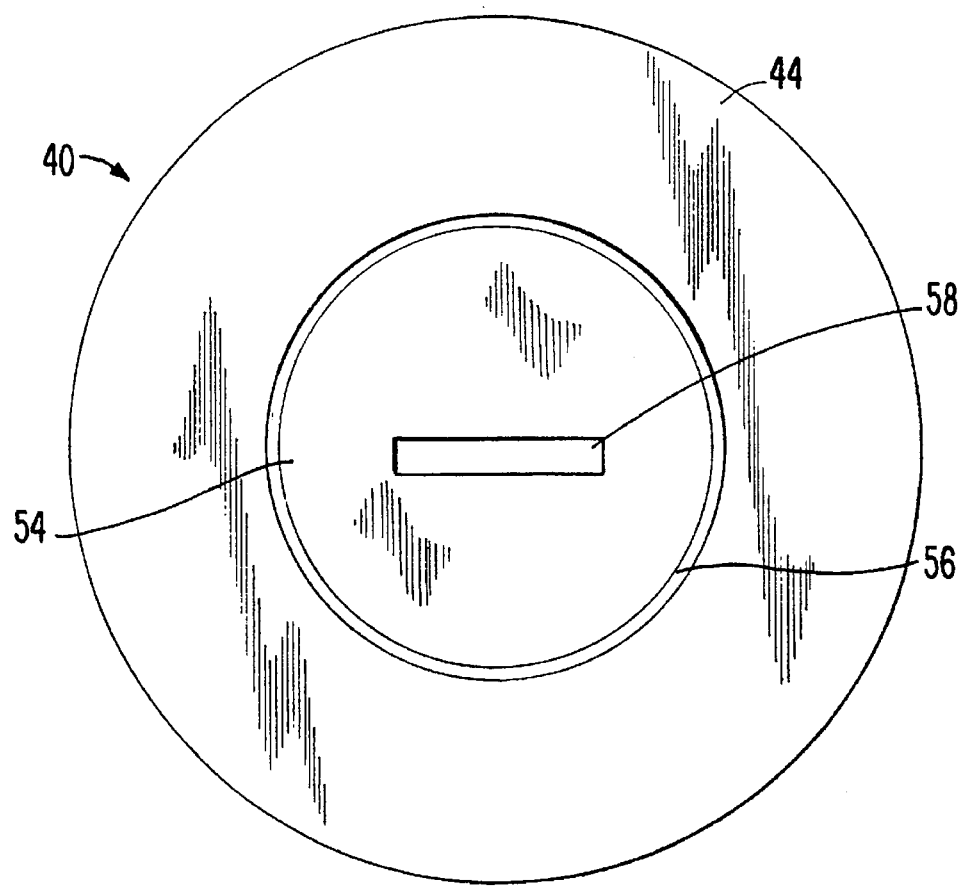

ANCHOR

BACKGROUND OF THE INVENTION

1. Field of the Invention

The present invention relates to a construction anchor, and more particularly to a construction anchor receivable in a hole defined in structural materials, such as masonry, concrete, wood or metal, to secure an object or fixture to the surface of the structural material.

2. Description of the Prior Art

Construction anchors of the above-mentioned general type are known in the art. Typically, such anchors are made of metal in a substantially cylindrical shape. They also include a longitudinal threaded bore in which an appropriately sized, headed bolt may be disposed.

In use, construction anchors of this general type are adhesively bonded into holes defined in masonry, concrete and similar materials. When the cement or adhesive, perhaps an epoxy, has sufficiently hardened or cured, an object may be mounted on the masonry surface by means of a bolt driven into the threaded bore of the construction anchor.

In the prior art, it has proven to be difficult to set the construction anchors to a uniform depth in the holes drilled in the structural material. In addition, as the cement or adhesive is introduced into the hole before the construction anchor, it has a tendency to be forced out of the hole as the construction anchor is being introduced thereinto, and to exude or seep into the threaded bore, where it may harden and prevent a bolt from being readily disposed therein. The introduction of dust and dirt into the threaded bore causes similar problems.

U.S. Pat. No. 5,263,804 shows a construction anchor which represents a solution to these deficiencies of the prior art. The construction anchor includes a metal anchoring portion and a plastic cap. The cap has a flange which is of a larger diameter than that of the hole in which it is to be inserted, so that the anchor may be seated in the hole to an optimum depth. The cap also has a plurality of longitudinal raised ridges spaced circumferentially thereabout, so that the anchor may be centered in the hole. The metal anchoring portion, in addition to including a threaded bore, has at least one annular groove defining a conically shaped lobe at the end thereof opposite to that having the threaded bore. The anchor is adapted to be inserted, metal anchoring portion first, into a pre-drilled adhesive-filled hole. When the adhesive has set, a screw or bolt is inserted through the top of the plastic cap to engage the threads in the threaded bore. The conically shaped lobe inhibits the removal of the anchor from the hole, once the adhesive has hardened, by wedging the adhesive against the hole walls when forces tending to extract the anchor from the hole act thereupon.

The cap of the anchor shown in U.S. Pat. No. 5,263,804 has a preselected longitudinal length which provides a stretch zone for a screw or bolt disposed in the threaded bore. The stretch zone enables the screw or bolt to withstand dynamic cyclical loading or vibration forces, as the initial stress placed thereon during tightening tends to elongate the screw or bolt, enabling either to overcome "creep" at peak dynamic cyclical loading or the effects of vibration induced by wind or other forces. The length of the cap also provides space for the "fingers" which are bent inward from the center portion of the top thereof when a screw or bolt is pushed and enters therethrough.

In practice, the use of the cap to provide the stretch zone has led to problems, because the cap does not provide any lateral support to the screw or bolt. Without lateral support, the screw or bolt may bend and snap in response to shear forces. As a consequence, the need for an improvement upon the anchor shown in U.S. Pat. No. 5,263,804 has arisen. The present invention provides such an improvement.

SUMMARY OF THE INVENTION

The present invention is a construction anchor having a two-piece construction including a generally cylindrical anchoring portion onto which a cap is fixedly attached. The cap covers a threaded bore, adapted to receive a bolt, in the anchoring portion. The intended purpose of the construction anchor is to securely retain an object against the surface of a structural material such as masonry, concrete, wood or metal.

The cap has a two-fold purpose. It may be provided with an annular flange, intended to sit on the periphery of the hole into which the construction anchor is to be inserted, so that the construction anchor may be set into the hole at a predetermined depth. The cap also prevents the adhesive used to bond the construction anchor within the hole from entering the threaded bore of the anchoring portion.

The anchoring portion may also have one or more annular grooves defining lobes at its lower end, that is, the innermost end with reference to the hole into which the construction anchor is to be inserted, to provide an interconnection with the adhesive. The upper end of the anchoring portion may have longitudinal splines or diamond knurling which serve to prevent rotation of the construction anchor, after it has been cemented into a hole, as a bolt is threadingly connected thereto.

The threaded bore of the anchoring portion includes an unthreaded close-fit-counterbore portion outward of a threaded portion. The unthreaded close-fit-counterbore portion provides a stretch zone for a bolt engaged within the threaded portion.

The cap may also have a plurality of longitudinal raised ridges on its outer surface below the annular flange, so that it may fit snugly and may be centered within an appropriately dimensioned hole, yet may also permit the adhesive placed in the hole prior to the construction anchor to exude or seep outward between the raised ridges as the anchor is inserted therein to firmly hold it along its entire length within the hole. The raised ridges are preferably thin in a lateral direction to maximize the amount of adhesive around the top of the anchor. The longitudinal raised ridges may also extend below the rim of the cap.

The construction anchor of the present invention is particularly effective in maintaining secure holding power even when subjected to dynamic cyclical loading or vibration. The bolt is installed with an applied initial stress which tends to elongate the bolt, whereby "creep" at peak dynamic cyclical loading and the effects of vibration induced by wind or other forces may be overcome.

The present invention will be described in more complete detail below with frequent reference being made to the accompanying figures, which may be identified as follows.

BRIEF DESCRIPTION OF THE DRAWINGS

FIG. 6 is a cross-sectional view of the cap taken as indicated by lines 6—6' in FIG. 5;

FIG. 7 is a view of the top of the cap;

DETAILED DESCRIPTION OF THE PREFERRED EMBODIMENT

Figure 1:
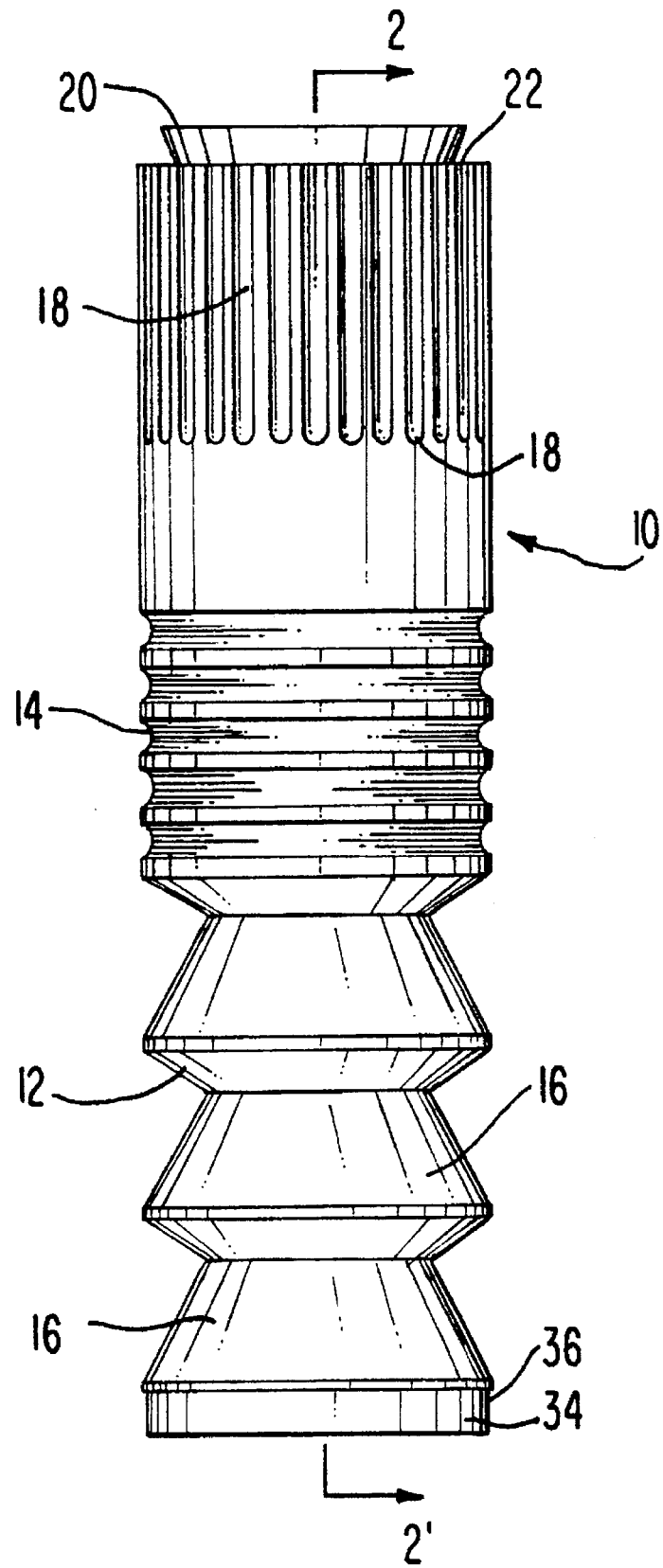
FIG. 1 is a side view of the anchoring portion of the construction anchor of the present invention.

FIG. 1 is a side view of the anchoring portion 10 of the construction anchor of the present invention. The lower end of the anchoring portion 10 may be provided with at least one first annular groove 12 and with at least one second annular groove 14, but is otherwise substantially cylindrical in shape. The first annular grooves 12 are deeper and wider than the second annular grooves 14, and provide the anchoring portion 10 with at least one conically shaped lobe 16 having a surface oriented obliquely with respect to a longitudinal axis of the anchoring portion 10. The first annular grooves 12 and the second annular grooves 14 provide an interconnection between the anchoring portion 10 and the adhesive used to hold it within a hole in masonry or the like, so that it may resist extraction therefrom. The conically shaped lobe or lobes 16, having a face oriented obliquely upward and outward with respect to the hole, provide a wedging action and a uniform compressive load distribution upon the adhesive against the wall of the hole to further inhibit the extraction of the anchor therefrom. As shown in FIG. 1, first annular grooves 12 are formed asymmetrically to maximize the areas of the conically shaped lobes 16. This maximizes the area over which the anchoring portion 10 may compress an adhesive upwardly and outwardly against the wall of a hole under an outward pull force.

The upper end of the anchoring portion 10 has a plurality of longitudinal splines 18. The longitudinal splines 18 also provide an interconnection between the anchoring portion 10 and the adhesive, so that the anchoring portion 10 may resist rotation within a hole when a bolt is being threadingly connected thereto.

At the very upper end of the anchoring portion 10 is a narrowed extension 20 having an annular groove 22 thereabout. Annular groove 22 provides a means by which the cap, to be described below, may be attached with a tight seal to the anchoring portion 10.

Below the bottommost lobe 16 of the anchoring portion 10 may be provided a cylindrical extension 34 defining a shoulder 36. Shoulder 36 allows for the fitting of a dosage control screen or tube as more fully described in copending and commonly assigned U.S. patent application Ser. No. 08/258,841, filed Jun. 13, 1994.

Figure 2:
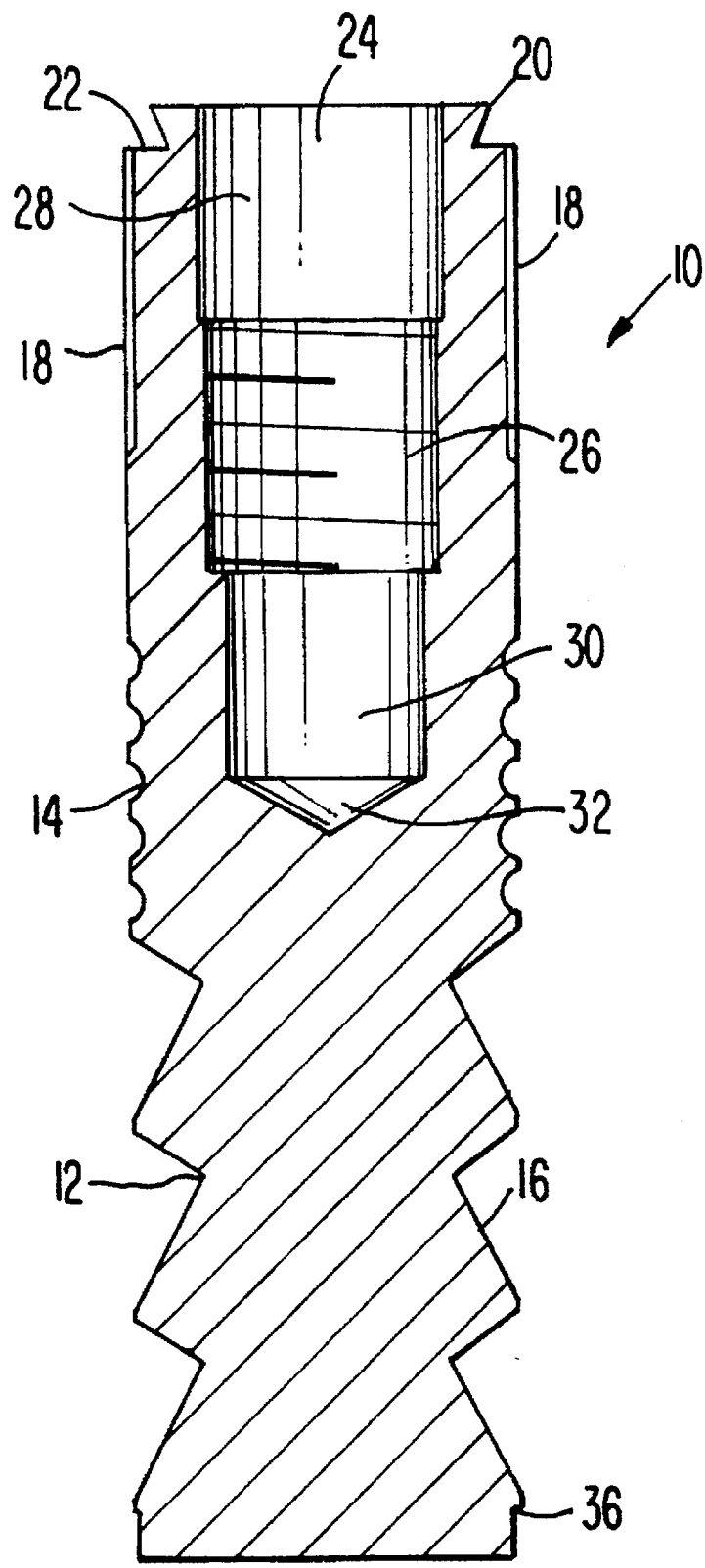
FIG. 2 is a cross-sectional view of the anchoring portion taken as indicated by lines 2—2' in FIG. 1.

FIG. 2 is a cross-sectional view of the anchoring portion 10 taken as indicated by lines 2—2' in FIG. 1. As is shown, the upper end of the anchoring portion 10 is provided with a threaded bore 24. The threaded bore 24 has a threaded portion 26 beneath, or inward of, an unthreaded close-fit-counterbore portion 28. Unthreaded close-fit-counterbore portion 28, which lies between threaded portion 26 and narrowed extension 20, provides a stretch zone for the bolt or screw being anchored in a structural material by the anchor of the present invention in a manner to be illustrated below.

The threaded bore 24 has an innermost portion 30, which may or may not be threaded, having a lowest point 32. First annular groove or grooves 12, which provide one or more conically shaped lobes 16, are preferably disposed on the outer surface of the anchoring portion 10 below the lowest point 32 of the threaded bore 24.

Figure 3:
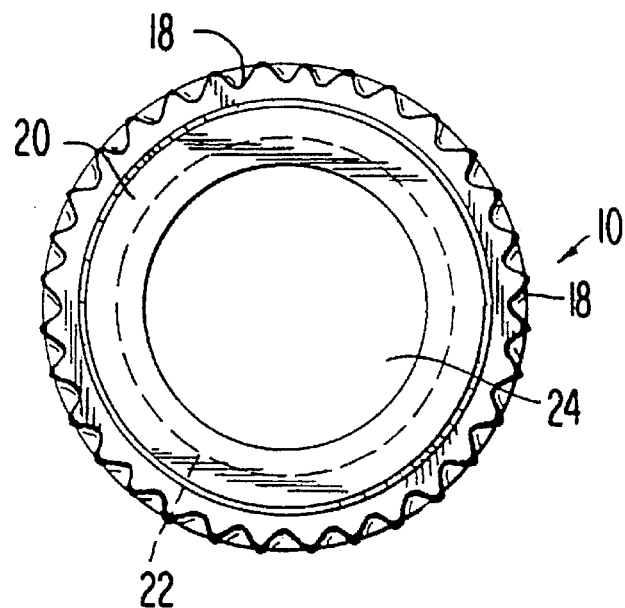
FIG. 3 is a view of the upper end of the anchoring portion.

FIG. 3 is a view of the upper end of the anchoring portion 10 showing the threaded bore 24, which is centered in the narrowed extension 20 thereof. Longitudinal splines 18 are arranged about the circumference of the surface of the anchoring portion 10. Annular groove 22 about narrowed extension 20 is indicated by the dashed circle in FIG. 3.

Figure 4:
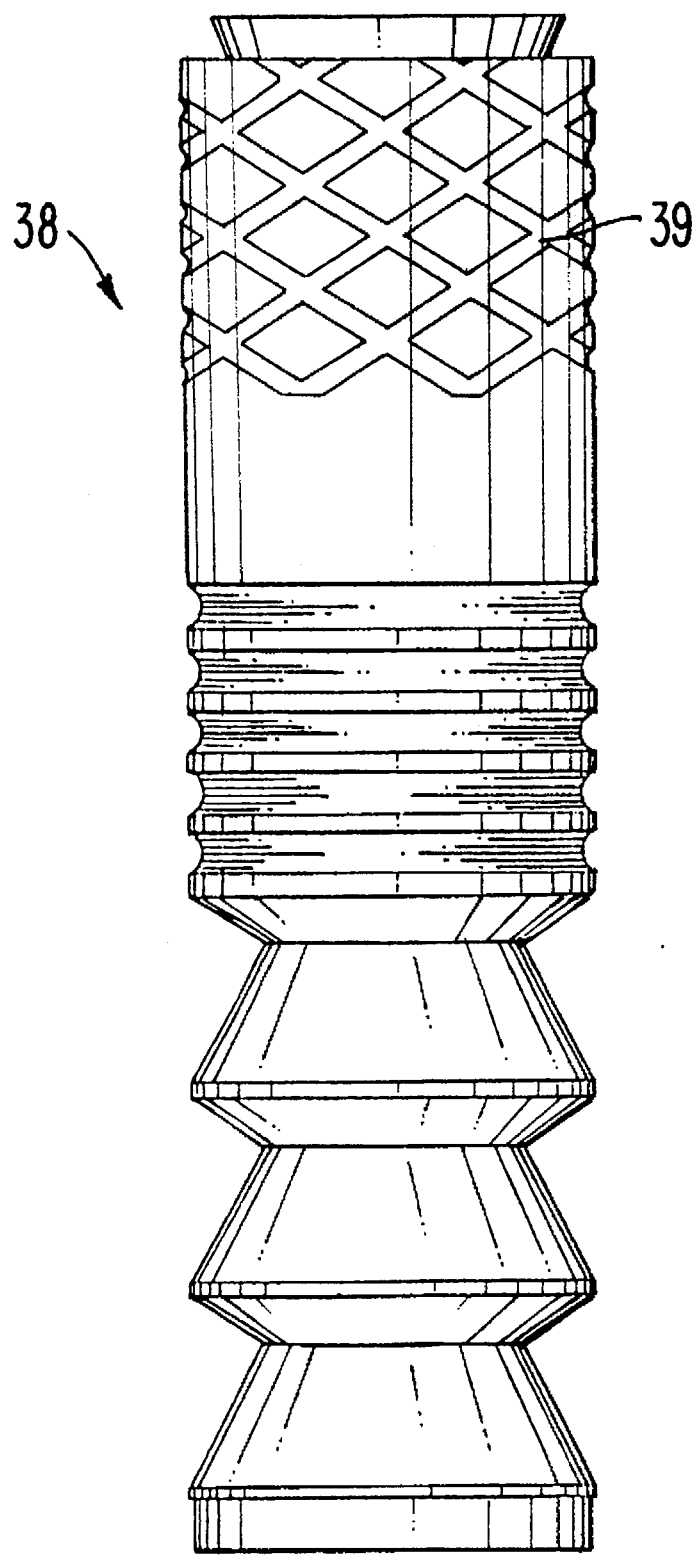
FIG. 4 is a side view of an alternate embodiment of the anchoring portion of the construction anchor of the present invention.

FIG. 4 is a side view of an alternate embodiment of the anchoring portion of the construction anchor of the present invention, wherein anchoring portion 38 has knurling 39 at its upper end instead of longitudinal splines. Knurling 39 may be provided in a diamond pattern as shown. As was the case with longitudinal splines, knurling 39 provides an interconnection between the anchoring portion 38 and the adhesive, so that the anchoring portion 38 may resist rotation within a hole when a bolt is being threadingly connected thereto.

The anchoring portion 10, 38 of the construction anchor is preferably made of metal, such as, for example, zinc-plated steel.

Figure 5:
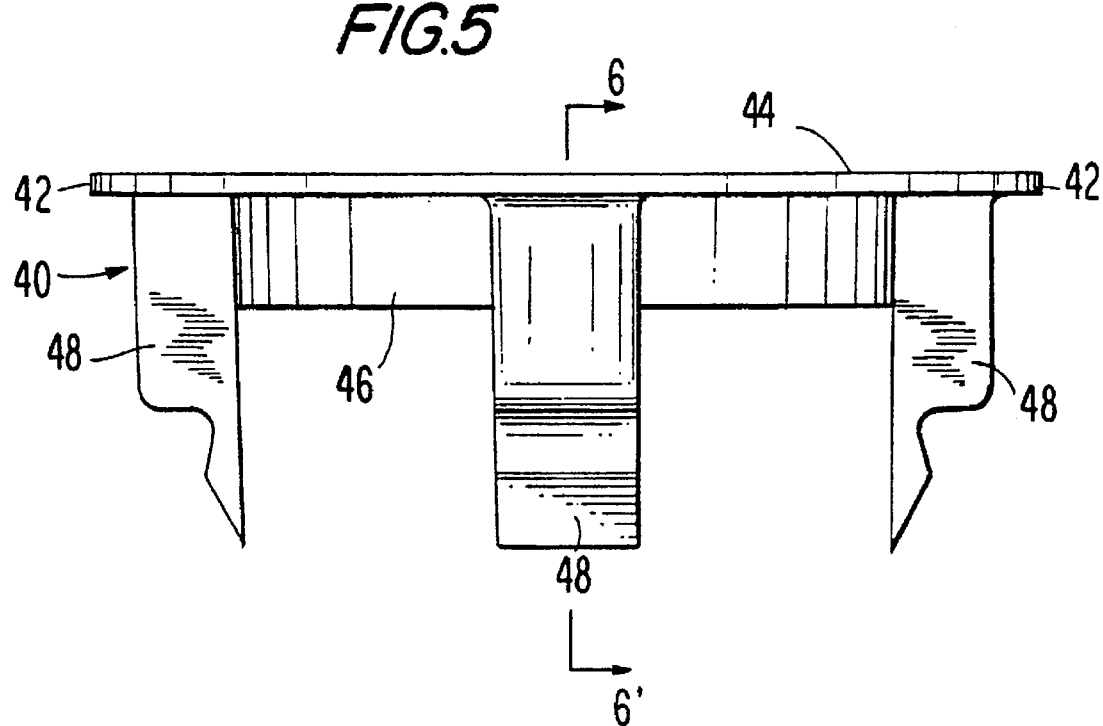
FIG. 5 is a side view of the cap of the construction anchor.

FIG. 5 is a side view of the cap 40 of the construction anchor of the present invention. The cap 40 includes an annular flange 42 extending from and forming a continuation of its upper surface 44. Below the annular flange 42, on the outer surface 46 of the cap 40 and extending therebelow, are a plurality of longitudinal raised ridges 48, whose function will be discussed below.

FIG. 6 is a cross-sectional view of the cap 40 taken as indicated by lines 6—6' in FIG. 5. The bottom of the cap 40 is open, and has an inwardly radial flange 50 at the base of its inner surface 52. Flange 50 snappingly fits into annular groove 22 on the narrowed extension 20 of the anchoring portion 10 to join the cap 40 thereto. Accordingly, cap 40 is snap-fit or interference-fit onto anchoring portion 10. However, it should be understood that the cap 40 may also be press-fit or tightly and snugly fit onto the anchoring portion 10 in a variety of other manners without departing from the scope of the present invention.

The upper surface 44 of the cap 40 is closed, but is provided with a central circular area 54 defined by a circular boundary 56 of reduced thickness extending thereabout and providing a weakened area separating central circular area 54 from the rest of the upper surface 44 of the cap 40. As shown in both FIG. 6 and FIG. 7, which is a view of the top of the cap 40, the central circular area 54 may have a slot 58, so that a sharp instrument, such as a screwdriver, may be inserted therein and used to remove the central circular area 54 from the cap 40 by breaking the circular boundary 56 of reduced thickness to afford access through the upper surface 44, when the construction anchor is actually in use as described below. For this reason, the cap 40 is preferably fashioned from a plastic material, such as polyethylene or a copolymer thereof.

Figure 8:
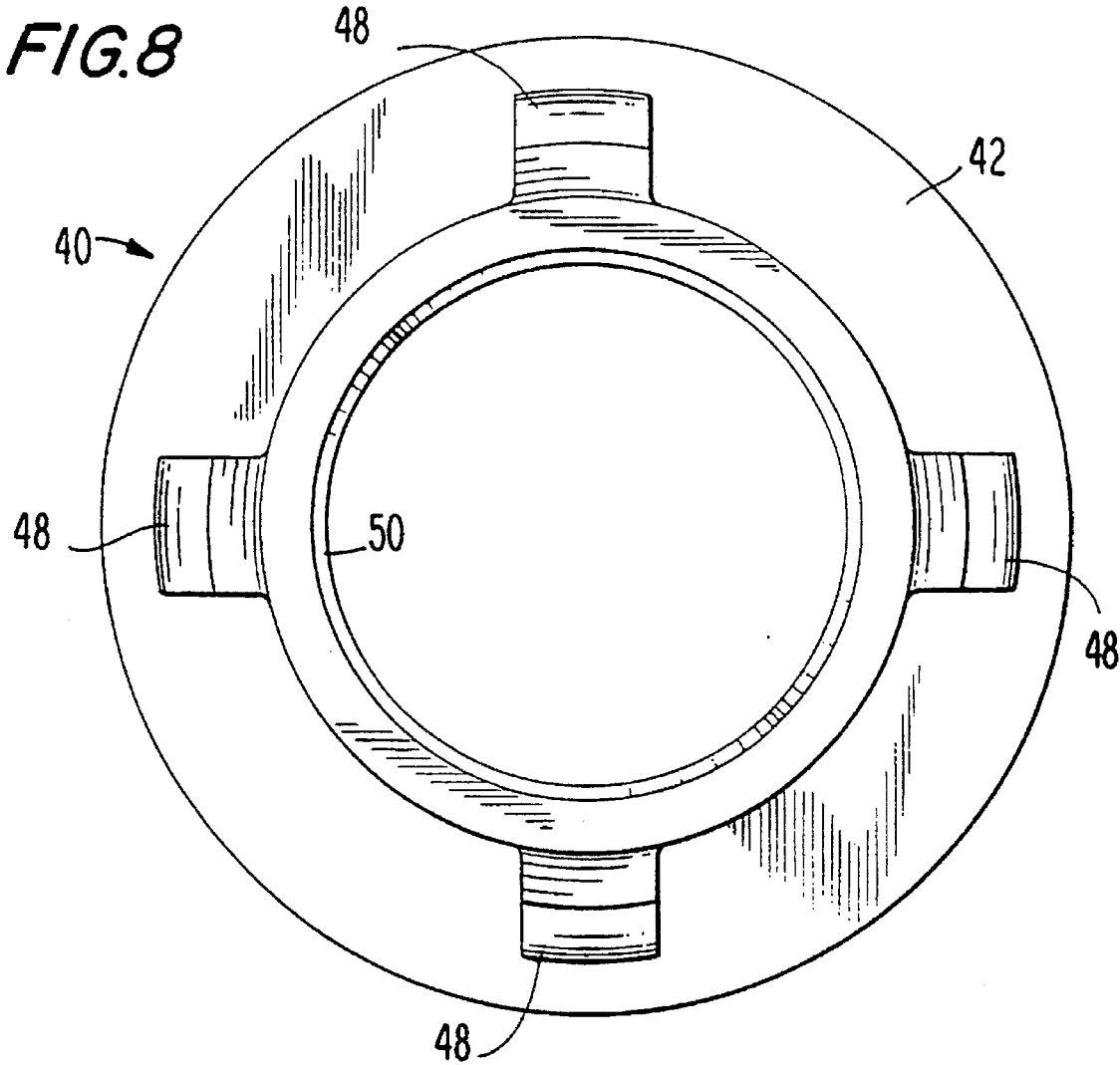
FIG. 8 is a view of the cap from below.

FIG. 8 is a view of the cap 40 from below, and shows flange 50 extending radially inward about the lower inside edge thereof. Annular flange 42 extends radially outward beyond the longitudinal raised ridges 48. The construction anchor of the present invention is designed for use in a hole of radius slightly less than that represented by the maximum radial extent of longitudinal raised ridges 48, so that it, and specifically the cap 40 thereof, may be inserted into such a hole until the annular flange 42 comes to rest against the edge thereof and prevents any further insertion. Longitudinal raised ridges 48 also ensure that the cap 40 centers the construction anchor within the hole, and allow the adhesive, placed into the hole before the construction anchor, to seep outward therebetween up to the annular flange 42 at the top of the cap 40 for increased shear strength. The amount of adhesive at the top of the cap 40 is maximized by making the ridges 48 thin in a lateral direction.

Figure 9:
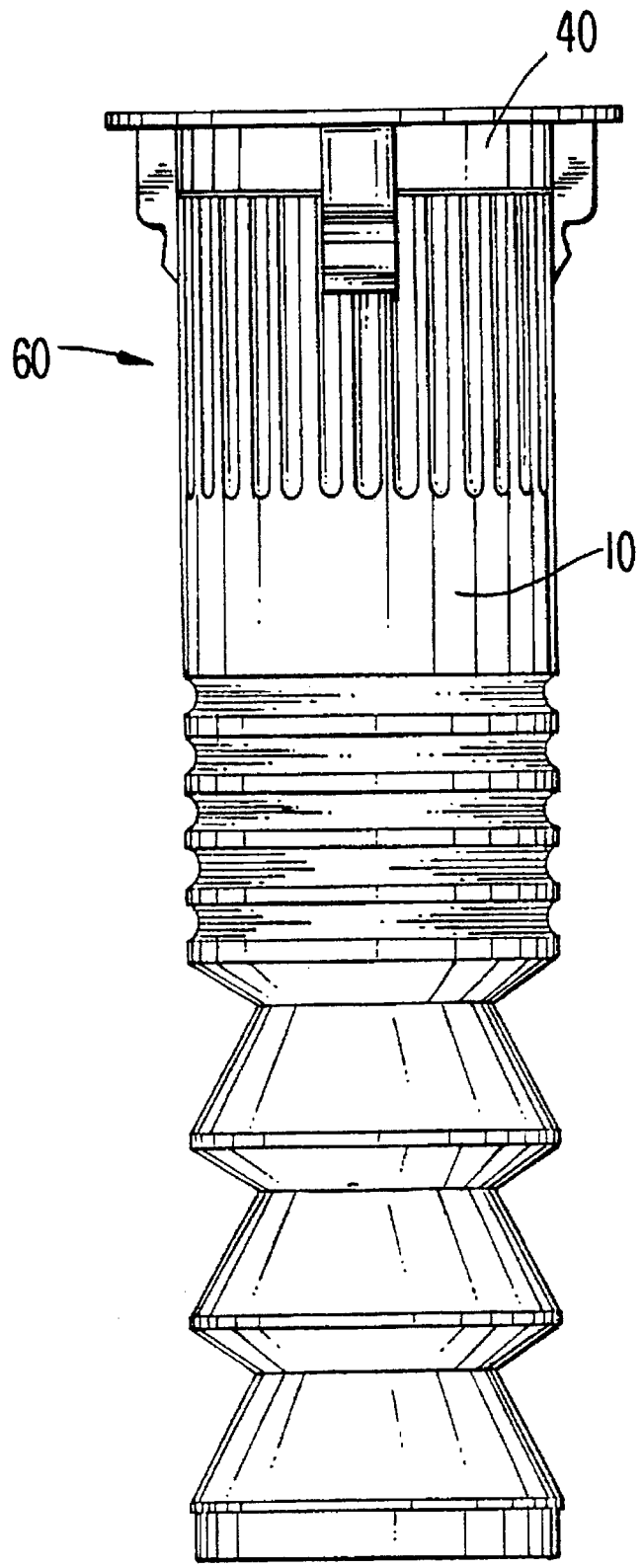
FIG. 9 is a plan view of the construction anchor.

FIG. 9 is a plan view of the construction anchor 60 of the present invention wherein cap 40 is fixedly attached as intended and designed to anchoring portion 10.

Figure 10:
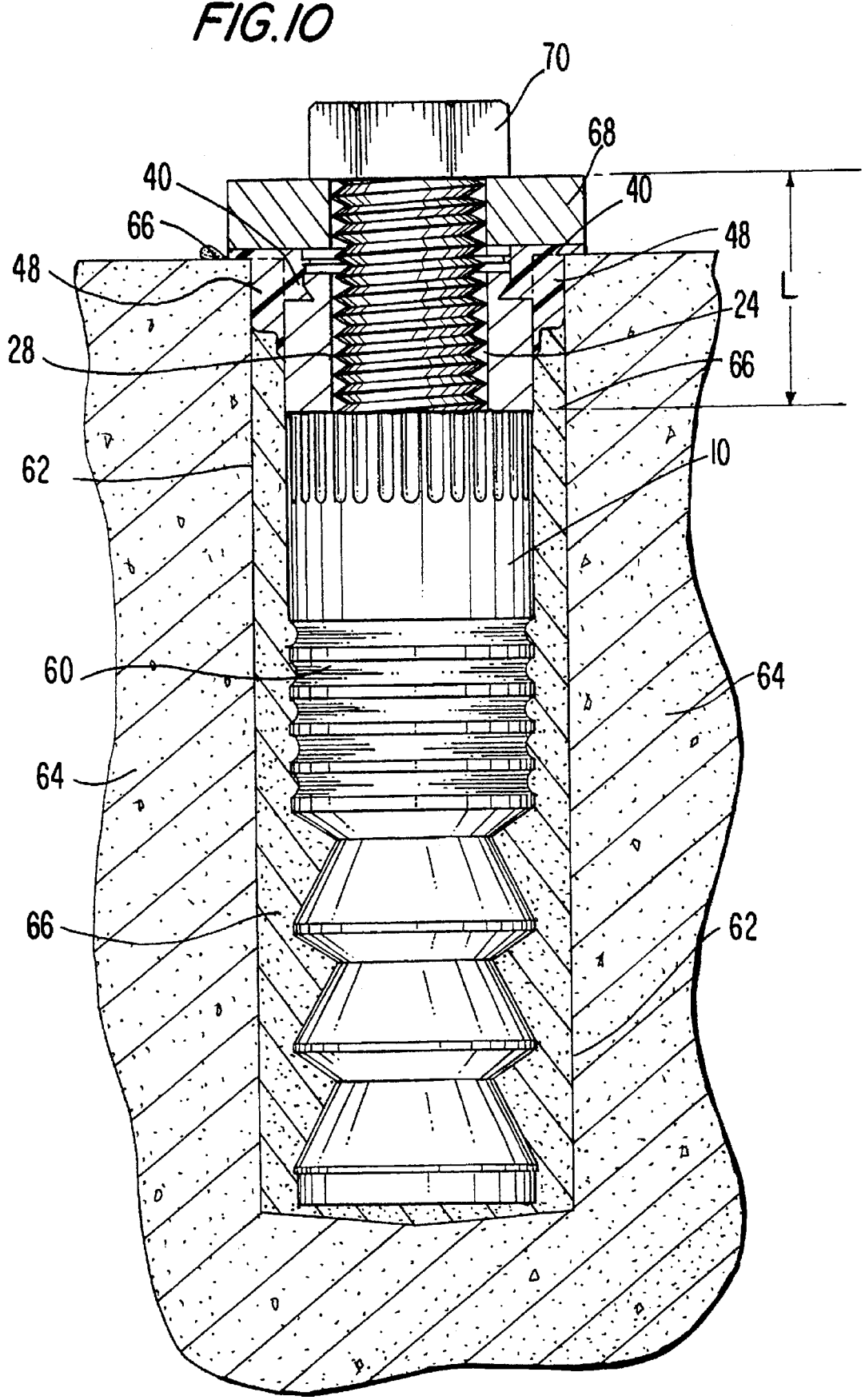
FIG. 10 illustrates the use of the construction anchor of the present invention.

The use of construction anchor 60 is illustrated in FIG. 10. The construction anchor 60 is shown partially cross-sectioned; that is to say, the upper part of the anchoring portion 10 and the cap 40 are shown in cross section to illustrate their cooperative relationship.

In practice, a hole 62 of radius slightly smaller than that represented by the maximum radial extent of longitudinal raised ridges 48 is drilled into a structural material, such as concrete 64, and the hole 62 is cleaned of debris by brush or air hose. An injection gun is then used to inject a construction adhesive, such as epoxy 66, into the hole 62. Thereafter, the construction anchor 60 is inserted into the hole 62 with the annular flange 42 on cap 40 positioning the construction anchor 60 at the proper depth in the hole 62, and with the longitudinal raised ridges 48 centering the construction anchor in the hole 62. As the construction anchor 60 is inserted into the hole 62, it becomes immersed in the epoxy 66 previously injected thereinto. The cap 40 prevents the epoxy 66, as well as dust and dirt, from entering the threaded bore 24 in the anchoring portion 10.

Once the epoxy 66 has set and hardened, the central circular area 54 of the upper surface 44 of the cap 40 is removed to expose the threaded bore 24 directly beneath. As noted above, central circular area 54 is separated from the rest of the upper surface 44 of the cap 40 by a circular boundary 56 of reduced thickness which provides a weakened area enabling the central circular area 54 to be removed using a screwdriver or other sharp implement. To facilitate such removal, the cap 40 is ideally fashioned from a plastic material, such as polyethylene or a copolymer thereof.

A fixture 68 to be attached to the structural material is then positioned over the construction anchor 60 and a mounting bolt 70 is inserted through a hole in fixture 68 and through hole in the upper surface 44 of the cap 40 left by the removal of central area 54. The bolt 70 is threadingly engaged into the threaded bore 24 of the anchoring portion 10, and firmly tightened to secure fixture 68 to the structural material. The tightening of the bolt 70 applies an initial stress which tends to elongate it very slightly over length L between its head and threaded portion 26 of the threaded bore 24. Much of length L of bolt 70 is within unthreaded close-fit-counterbore portion 28 of threaded bore 24. Unthreaded close-fit-counterbore portion 28 provides bolt 70 with lateral support to prevent shear forces from bending it far enough to snap it.

Unthreaded close-fit-counterbore portion 28 of threaded bore 24 provides a stretch zone (length L) for bolt 70 largely within the anchoring portion 10. Length L takes up the strain on bolt 70 arising from its being initially tightened into place. The longer length L is, the more strain may be placed upon bolt 70, and the more load bolt 70 will be able to accept, without generating a localized strain thereon. At the same time, unthreaded portion 28 of threaded bore 24 provides the bolt 70 with lateral support against the bending effect of shear forces. This reduces the possibility that shear forces acting on bolt 70 will snap it from anchoring portion 10, as such forces will bring the bolt 70 into contact with unthreaded close-fit-counterbore portion 28 of threaded bore 24.

Modifications to the invention described above would be obvious to those skilled in the art, and would not bring the invention so modified beyond the scope of the appended claims.

What is claimed is:

1. A construction anchor for retaining an object against a structure of masonry, concrete, wood or metal said construction anchor, in use, being secured within a hole defined in said structure, said construction anchor comprising:

an anchoring portion having a first end, a second end, a longitudinal axis, a threaded bore extending partially therethrough from said first end, said threaded bore terminating proximal said first end in an unthreaded close-fit-counterbore portion outward of a threaded portion, said unthreaded close-fit-counterbore portion having a uniform diameter extending to said first end providing a stretch zone for a bolt engaged in said threaded portion, and at least one first annular groove around said second end, thereby providing at least one lobe at said second end of said anchoring portion, said lobe having a surface oriented obliquely with respect to said longitudinal axis, said threaded bore terminating within said anchoring portion short of said at least one first annular groove; and a cap fixedly attached to said first end to cover said threaded bore.

2. A construction anchor as claimed in claim 1 wherein said anchoring portion is made of metal.

3. A construction anchor as claimed in claim 2 wherein said metal is zinc-plated steel.

4. A construction anchor as claimed in claim 1 wherein said anchoring portion has at least one second annular groove, said at least one second annular groove being narrower in a longitudinal direction along said anchoring portion than said at least one first annular groove.

5. A construction anchor as claimed in claim 4 wherein said at least one first annular groove is deeper than said at least one second annular groove.

6. A construction anchor as claimed in claim 1 wherein said anchoring portion has at least one longitudinal spline at said first end.

7. A construction anchor as claimed in claim 1 wherein said anchoring portion has a plurality of longitudinal splines at said first end.

8. A construction anchor as claimed in claim 1 wherein said anchoring portion is knurled at said first end thereof.

9. A construction anchor as claimed in claim 1, wherein said anchoring portion is knurled in a diamond pattern at said first end thereof.

10. A construction anchor as claimed in claim 1 wherein said at least one first annular groove is a plurality of first annular grooves, each of said plurality being separated from one adjacent thereto by one of said lobes.

11. A construction anchor as claimed in claim 1 wherein said cap is of a plastic material.

12. A construction anchor as claimed in claim 11 wherein said plastic material is selected from the group consisting of polyethylene and copolymers thereof.

13. A construction anchor as claimed in claim 1 wherein said first end of said anchoring portion having said threaded bore has a narrowed extension and said cap fits tightly about said narrowed extension.

14. A construction anchor as claimed in claim 13 wherein said narrowed extension of said anchoring portion has an annular groove extending thereabout, and wherein said cap has an annular flange extending about the base of its inner surface, so that said cap may be snap-fit or slip-fit onto said anchoring portion.

15. A construction anchor as claimed in claim 1 wherein said cap has an outer surface, said outer surface having a plurality of longitudinal raised ridges for disposing said construction anchor evenly within said hole in said structure, said longitudinal raised ridges centering and suspending said construction anchor in said hole.

16. A construction anchor as claimed in claim 15 wherein said longitudinal raised ridges extend beyond a rim of said cap.

17. A construction anchor as claimed in claim 1 wherein said cap has an upper surface, said upper surface having a central area separated from the remainder thereof by a boundary of reduced thickness, said central area being removable from said upper surface around said boundary, said upper surface protecting said threaded bore from dirt.

18. A construction anchor as claimed in claim 1 wherein said cap has an annular flange seatable on the periphery of said hole, so that said construction anchor may be set into said hole at a predetermined and consistent depth.

* * * * *